(12) United States Patent
Tang et al.

(10) Patent No.: US 9,345,032 B2
(45) Date of Patent: May 17, 2016

(54) METHOD AND APPARATUS FOR DETERMINING NETWORK CLUSTERS FOR WIRELESS BACKHAUL NETWORKS

(75) Inventors: Taiwen Tang, Zhaozhen Town (CN); Hayssam Dahrouj, Toronto (CA); Jerry Chow, San Diego, CA (US); Wei Yu, Toronto (CA)

(73) Assignee: BLINQ WIRELESS INC., Ottawa (CA)

( * ) Notice: Subject to any disclaimer, the term of this patent is extended or adjusted under 35 U.S.C. 154(b) by 250 days.

(21) Appl. No.: 14/129,150

(22) PCT Filed: Jun. 29, 2012

(86) PCT No.: PCT/CA2012/000621
§ 371 (c)(1),
(2), (4) Date: Dec. 24, 2013

(87) PCT Pub. No.: WO2013/000068
PCT Pub. Date: Jan. 3, 2013

(65) Prior Publication Data
US 2014/0126514 A1    May 8, 2014

Related U.S. Application Data

(60) Provisional application No. 61/503,336, filed on Jun. 30, 2011.

(51) Int. Cl.
*H04W 72/04* (2009.01)
*H04W 72/08* (2009.01)
(Continued)

(52) U.S. Cl.
CPC .......... *H04W 72/0486* (2013.01); *H04W 24/02* (2013.01); *H04W 72/082* (2013.01); *H04W 24/08* (2013.01); *H04W 92/045* (2013.01)

(58) Field of Classification Search
CPC ... H04L 72/082; H04L 72/0486; H04L 24/08; H04L 92/045
See application file for complete search history.

(56) References Cited

U.S. PATENT DOCUMENTS 5,956,642 A    9/1999  Larsson et al.
7,729,257 B2   6/2010  Kodialam et al.
(Continued)

FOREIGN PATENT DOCUMENTS

CA    2809721    3/2012
WO    96/31009   10/1996
(Continued)

OTHER PUBLICATIONS

S. G. Kiani and D. Gesbert, entitled "Optimal and Distributed Scheduling for Multicell Capacity Maximization" IEEE Trans. Wireless Commun., vol. 7, No. 1, pp. 288-297, Jan. 2008.
(Continued)

*Primary Examiner* — Mark Rinehart
*Assistant Examiner* — Gbemileke Onamuti
(74) *Attorney, Agent, or Firm* — de Wilton Intellectual Property Inc.

(57) ABSTRACT

Practical methods and apparatuses are provided for determining network clusters in wireless backhaul networks comprising a plurality of hubs (102) and Remote Backhaul Modules (RBM) (104) based on link quality value (LQV) metrics. From an input LQV table of LQV values for each hub-RBM link (110), the link quality values are first ranked. Clusters are then identified from all the possible links based on the order of the highest link quality value to the lowest link quality value, any constraints on the number of RBMs per cluster, and clustering each RBM only once. Links with strong link quality values are chosen to optimize the LQV metric. LQV based clustering achieves a higher average LQV, e.g., average spectrum efficiency or weighted sum spectrum efficiency, for the entire backhaul network compared to the geographic location based clustering. The method is straightforward to implement and has low computational complexity.

10 Claims, 9 Drawing Sheets

(51) Int. Cl.
*H04W 24/02* (2009.01)
*H04W 24/08* (2009.01)
*H04W 92/04* (2009.01)

(56) References Cited

U.S. PATENT DOCUMENTS

| | | |
|---|---|---|
| 7,826,417 B2 | 11/2010 | Yang et al. |
| 2004/0087327 A1 | 5/2004 | Guo |
| 2009/0197603 A1 | 8/2009 | Ji et al. |
| 2010/0009748 A1 | 1/2010 | Timperley |
| 2010/0087149 A1 | 4/2010 | Srinivasan et al. |
| 2010/0097948 A1 | 4/2010 | Barberis |
| 2010/0159841 A1 | 6/2010 | Barberis et al. |
| 2011/0222455 A1 | 9/2011 | Hou et al. |
| 2011/0249597 A1* | 10/2011 | Papadopoulos ....... H04L 5/0023 370/280 |
| 2012/0133557 A1 | 5/2012 | Beaudin |
| 2012/0236731 A1 | 9/2012 | Beaudin |
| 2012/0281648 A1 | 11/2012 | Dahrouj et al. |

FOREIGN PATENT DOCUMENTS

| | | |
|---|---|---|
| WO | 2005/101862 | 10/2005 |
| WO | 2008/033369 | 3/2008 |
| WO | 2008/096383 | 8/2008 |
| WO | 2009/066986 | 5/2009 |
| WO | 2009/119463 | 10/2009 |
| WO | 2010/003509 | 1/2010 |
| WO | 2010/013245 | 2/2010 |
| WO | 2011/037319 | 3/2011 |
| WO | 2012/037643 | 6/2012 |
| WO | 2013/000068 | 1/2013 |

OTHER PUBLICATIONS

L. Venturino, N. Prassad, and X. Wang, entitled "Coordinated Scheduling and Power Allocation in Downlink Multicell OFDMA Networks," IEEE Trans. Veh. Technol., vol. 6, No. 58, pp. 2835-2846, Jul. 2009.

A. L. Stolyar and H. Viswanathan, entitled "Self-Organizing Dynamic Fractional Frequency Reuse for Best-Effort Traffic Through Distributed Intercell Coordination," in INFOCOM, Apr. 2009.

M. X. Gong, et al., "Load- and Interference-Aware Channel Assignment for Dual-Radio Mesh Backhauls", 2008 IEEE Global Telecommunications Conference (IEEE GLOBECOM 2008), pp. 1-6, Nov. 30-Dec. 4, 2008.

* cited by examiner

| | |
|---|---|
| Topology | 3 sector per cell |
| Number of hubs | 21, 57, 111 |
| Frequency reuse | 1 |
| Number of RBMs per hub | 4 |
| Channel bandwidth | 10 MHz |
| Hub max TX power per subcarrier | -32.7 dBw |
| Noise power per subcarrier | -158.6 dBw |
| Channel model | Stanford University Interim Model 3 |
| Number of frequency bins | 1 |
| Hub antenna 3dB beamwidth (one-sided) | 45 degree |
| RBM antenna 3dB beamwidth (one-sided) | 22.5 degree |
| Number of candidate locations per RBM | 1 |

Figure 5

| Modulation and coding format | SINR target (dB) |
|---|---|
| QPSK ¾ | 7 |
| 16QAM ½ | 11 |
| 16QAM ¾ | 14 |
| 64QAM 2/3 | 19 |
| 64QAM ¾ | 21 |
| 64QAM 5/6 | 23 |
| 256QAM 6/8 | 26 |
| 256QAM 7/8 | 30 |

Figure 6

METHOD AND APPARATUS FOR DETERMINING NETWORK CLUSTERS FOR WIRELESS BACKHAUL NETWORKS

CROSS-REFERENCE TO RELATED APPLICATIONS

This application claims priority from U.S. Provisional patent application Ser. No. 61/503,336, filed Jun. 30, 2011, entitled "Method and Apparatus for Determining Network Clusters for Wireless Backhaul Networks", which is incorporated herein by reference in its entirety.

This application is related to International Patent Application No. PCT/CA2011/001020 and to U.S. patent application Ser. No. 13/230,368, both of which were filed Sep. 12, 2011, entitled "System and Method for Co-Channel Interference Measurement And Managed Adaptive Resource Allocation for Wireless Backhaul", claiming priority from U.S. Provisional patent application No. 61/382,217, filed Sep. 13, 2010; this application is also related to U.S. patent application Ser. No. 13/463,478, entitled "Interference Mitigation with Scheduling and Dynamic Power Spectrum Allocation for Wireless Networks", filed May 3, 2012 claiming priority from U.S. Provisional patent applications No. 61/483,417, filed May 6, 2011 and No. 61/506,895, filed 12 Jul. 2011; all these applications are incorporated herein by reference in their entirety.

TECHNICAL FIELD

This invention relates to wireless systems with point-to-multipoint transmissions. It is particularly related to wireless backhaul networks, and methods and apparatus for resource allocation in such networks, for improved performance and data rate.

BACKGROUND

Wireless backhaul networks are deployed to carry the traffic between a wireless access network and the core network. For example, as described in the above referenced related co-pending applications, a wireless backhaul network may comprise a plurality of hubs, each connected to the wired core network, via Ethernet. Each hub serves multiple remote backhaul modules (RBM), in a point to multipoint configuration, using a wireless channel. Each RBM is deployed close to an access network base station, such as a small cell base station, and connected to the base station via a cable. The hubs are deployed at the locations where wired high capacity access to the core network is available, e.g. at a fiber point-of-presence.

In a wireless backhaul network, the term cluster refers to a number of RBMs and their respective serving hub. Methods and apparatus are required for determining which RBMs are served by each hub, i.e. for determining network clustering, to optimize or improve network performance. In particular, for non line-of-sight (NLOS) wireless backhaul networks it is desirable to have systems and methods for network clustering that overcome the limitations of conventional geographic location based network clustering.

Wireless backhaul networks can have different carrier frequency reuse factors. Interference is generated when multiple transmitters use the same carrier frequency. The data rate of any wireless link between a transmitter and a receiver, i.e. a hub-RBM link, in the network is directly related to the signal to interference and noise power ratio (SINR) in the system. It is desirable to have a clustering strategy that can utilize the SINR information to determine the clustering outcomes and thus to improve the average network data rate.

Hubs and RBMs are deployed at fixed locations, and hubs are located at elevated locations with sufficient height above obstacles or other environmental clutter. For example, in an urban area, hubs may be positioned on a tall building or a rooftop, above the clutter. Each RBMs is typically co-located with an access network base station, e.g. for a small cell base station, on a utility pole, sidewall of a building or other location below the roofline. Thus, typically there is not a direct line of sight between an RBM and a hub.

Based on empirical measurements, wireless channels of the backhaul network have relatively longer coherence time than those of the access network. The strongest one or two electromagnetic propagation paths between a hub and a RBM remain stationary because the environment at a sufficient height above the ground typically changes very little over time. That is, the wireless channel between any hub and RBM changes only when the environment changes significantly, such as when there is new construction, or a change of season in an area with trees. This fact motivates the use of directional antennas with fixed beam patterns for both hubs and RBMs in the backhaul network. Use of directional beam-forming antennas would be a promising enhancement to the performance for the backhaul system. In this application, the focus is on fixed beam patterns for both hubs and RBMs.

For point to multipoint coverage, any hub antenna may cover multiple RBM locations. A fixed hub pattern is used to cover a particular angle range. For example, similar to the access network, a cell, which defines the 360 degree coverage of the neighborhood around the center, can be divided into three 120 degree equally spaced sectors. In such an arrangement, each hub is deployed to cover one 120 degree sector with a fixed antenna pattern and three hub modules are co-located at the center of the cell.

An RBM antenna in the backhaul network needs to have a narrow beam width and steer its main lobe to the strongest angle of departure (AoD) direction between the hub and the RBM. Due to the narrow beam width of the RBM antenna and sufficient height of hub and RBM antennas, the power delay profile of the multi-path channel between the hub and the RBM confines most of the power in the first tap. This is different from wireless access networks where the height of mobile user antennas is low and omni-directional antennas are used for the mobile users. The frequency response of the channel in the backhaul network may have much less variability than that in the access network. The entire bandwidth may be divided into a number of frequency bins and be accessed by different hub-RBM links on a per-bin basis. The frequency domain modulation scheme can be either orthogonal frequency division multiple access (OFDMA), frequency division multiple access (FDMA) or single carrier modulation (if the number of bins is one). Based on the property of the power delay profile of the channel, the average channel gain in a pre-defined frequency bin in the frequency domain is a good representation of the channel response in this bin. The above referenced U.S. patent application Ser. No. 13/230,368, for example, discloses methods for managing resource allocation using clustering or grouping of links, based on co-channel interference metrics obtained from measurements of relative path loss or signal strength for each link.

Conventionally, in network planning, geographic location based clustering is used for wireless network clustering, i.e. using an algorithm based on the geographic position, or location index, of each transmitter and receiver module. However, such an approach may not be optimum for NLOS wireless backhaul links and is computationally complex.

For NLOS links having a similar hub-RBM separation distance, the effects of environmental clutter such as buildings or trees, referred to as shadow fading or log normal shadowing, may be quite different, and significantly affect relative path loss and signal strength. Geographic location based clustering does not account for these factors or e.g. use SINR information to improve network performance. Consequently, improved or alternative methods for network clustering are required for NLOS wireless backhaul networks.

An object of the present invention is to provide improved or alternative methods and apparatus for determining network clustering, for improved network performance in point-to-multipoint wireless networks and particularly for wireless backhaul solutions comprising fixed or stationary nodes with directional antennas, including small cell NLOS backhaul networks.

SUMMARY OF INVENTION

The present invention seeks to eliminate, or at least mitigate, disadvantages of known methods and apparatus, or at least provide an alternative.

The present invention provides methods and apparatus for clustering links in a wireless backhaul network based on link quality metrics for each hub-RBM link, referred to as "link quality based clustering". In a network comprising a plurality of hub-RBM links, network clustering comprises determining which Remote Backhaul Modules (RBMs) are served by a hub, to allow scheduling of resources based on said clustering of links to provide an increased network performance, for example an increased average link quality value.

According to one aspect of the invention, there is provided a method for determining network clusters in a wireless backhaul network comprising a plurality of hubs and a plurality of Remote Backhaul Modules (RBM), comprising: for each of a plurality of hub-RBM links, obtaining an input link quality value; ranking said input link quality values; and from the highest to lowest link quality values, satisfying constraints with respect to a maximum number of RBM per hub, and clustering each RBM only once, identifying each hub-RBM cluster from the ranked LQV values.

Preferably in embodiments of the present invention, the LQV is a weighted LQV, wherein weights comprise the weighted data rate of each link.

In preferred embodiments, the method comprises:
i. ranking link quality values of hub-RBM links for each of a plurality of candidate hub-RBM links, i.e. for multiple candidate RBM locations, and choosing the maximum value(s) of these link quality values to obtain an input link quality table; and
ii. reshaping the link quality table into a vector in a column-wise order and ranking link quality values of the link quality tables, and then
iii. from the highest to the lowest link quality links, identifying each hub-RBM cluster by excluding each RBM from being clustered more than once and by satisfying a maximum number of RBM per cluster constraint.

The link quality table vector comprises two dimensions corresponding to the hub index (hub ID) and the RBM index (RBM ID) wherein: for the $t^{th}$ position in the reordered LQV vector, the RBM ID and hub ID are computed as $$RBM\ ID(t) = \text{mod}\left(\frac{\pi^{-1}(t)-1}{NM}\right)+1$$

-continued
$$\text{hub}\ ID(t) = \text{floor}\left(\frac{\pi^{-1}(t)-1}{NM}\right)+1.$$

The step of ranking link quality values of hub-RBM links may comprises ranking link quality values of multiple candidate site locations for each RBM, and providing a link quality table vector that comprises three dimensions, corresponding to the hub index, RBM index and location index.

The step of obtaining or determining the link quality values for each hub-RBM link may comprises any one of:
a) obtaining a data rate of each link; or
b) obtaining a weighted data rate of each link wherein weights are assigned based on traffic conditions of the links; or
c) obtaining a SINR value of each link; or
d) obtaining an average SINR across frequency bins of each link; or
e) obtaining an average channel gain across frequency bins of each link; or
f) obtaining the inverse of the distance of each link.

Obtaining the link quality values may comprise measuring said link quality values for each of the plurality of hub-RBM links, for example measuring a SINR value for each link, or computing link quality values for each of a plurality of hub-RBM links from network parameters.

Where it is not feasible to measure SINR values, for example, these may be approximated as the SINR values for each bin using:

$$SINR_{ij} = \frac{G_{ij}[j \to i]g_{ij}P}{N_{ij} + \sum_{l \neq i} G_{ij}[j \to i]g_{lj}P}.$$

where the path loss and shadowing gain between hub i and RBM j in a linear scale is denoted by $g_{ij}$; the noise power is denoted by $N_{ij}$; the combined transmit and receive antenna gain is denoted by $G_{ij}[j \to i]$ assuming the mainlobe of the RBM j's antenna is steered towards hub i; and the transmit power of all hubs is denoted by P.

Thus a method and apparatus are provided for determining which RBMs are served by each hub in a wireless backhaul network. In particular, when LQV is defined as the SINR value of each link, methods according to embodiments of the invention use SINR information for determining the clustering outcomes and thus improve the average network data rate. Based on simulations, the method is demonstrated to provide improved performance relative to conventional geographic location based clustering.

Also provided is a metric that defines LQV as the weighted data rate of each link where weights can be assigned based on traffic conditions of the links; the data rate of each link; the average SINR across frequency bins of each link; the average channel gains across frequency bins of each link; or the inverse of the distance of each link.

For example, a weight based on data traffic condition of each hub and RBM link is assigned. When LQV is defined as the weighted data rate of each hub and RBM link, the proposed clustering strategy can achieve good quality of service across the backhaul network. When LQV is defined as the data rate of each link, the clustering strategy simply maximizes the average data rate of the network.

Another aspect of the invention provides apparatus in a wireless backhaul network comprising a processor and instructions, e.g. in a control node, for implementing the method steps of any one of the method claims.

Yet another aspect of the invention provides a computer readable medium storing instructions which when executed in a processor perform the method steps of any one of the method claims.

Additionally, there is provided a method for managing resource allocation for a plurality of radio links in a wireless network, comprising: clustering of links based on a link quality value (LQV) of each link, and scheduling resources to links based on said clustering of links to provide an increased average link quality value of the network.

Thus, methods, apparatus and metrics according to aspects of the present invention makes use of the link quality value (LQV) information, and advantageously a weighted LQV, of the hub-RBM links for determining clustering for improved network performance.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

FIG. 5 shows a table that summarizes the system parameters of the wireless backhaul network used to evaluate the performance of methods according to embodiments of the invention;

FIG. 6 shows a table that summarizes the modulation and coding format and the corresponding SINR target values of the wireless backhaul network;

DESCRIPTION OF PREFERRED EMBODIMENTS

Figure 1:
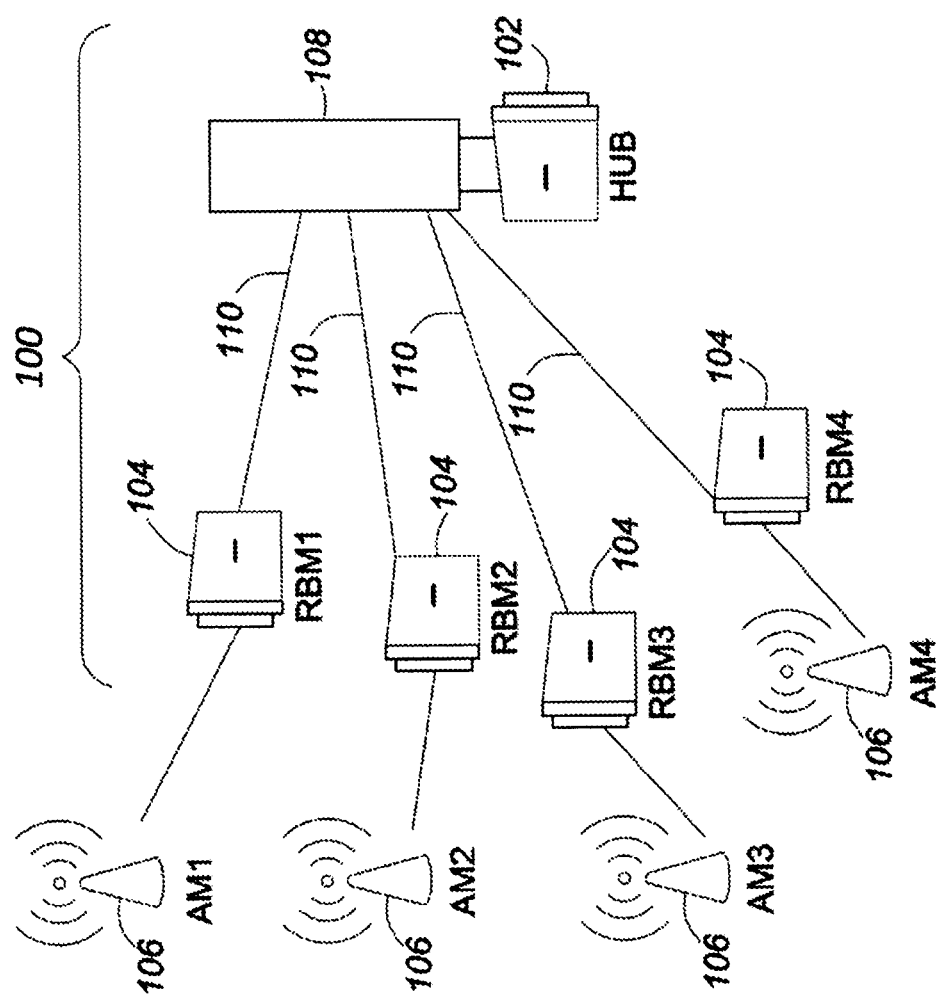
FIG. 1 shows an example of a cluster model for a backhaul network in which a cluster comprises one hub and four RBMs, and each RBM is co-located with an access module (AM)

FIG. 1 shows a schematic diagram representing an example of a cluster in a point-to-multipoint wireless backhaul network 100 comprising one hub module 102 serving four RBMs 104. Each RBM 104 is co-located with an access module (AM) 106, such as a small cell base station, with a wired connection, e.g. an Ethernet cable. The hub module 102 has a separate directional antenna 108 and RBMs each have integrated directional antenna that is directed towards the hub. Unlike a multi-hop architecture, there is only one hop from each RBM to a respective hub to carry the traffic. It is also different from the relay system where the access links and relay links share the same radio frequency band. The backhaul network operates at a different frequency band from that of the access network.

Figure 2:
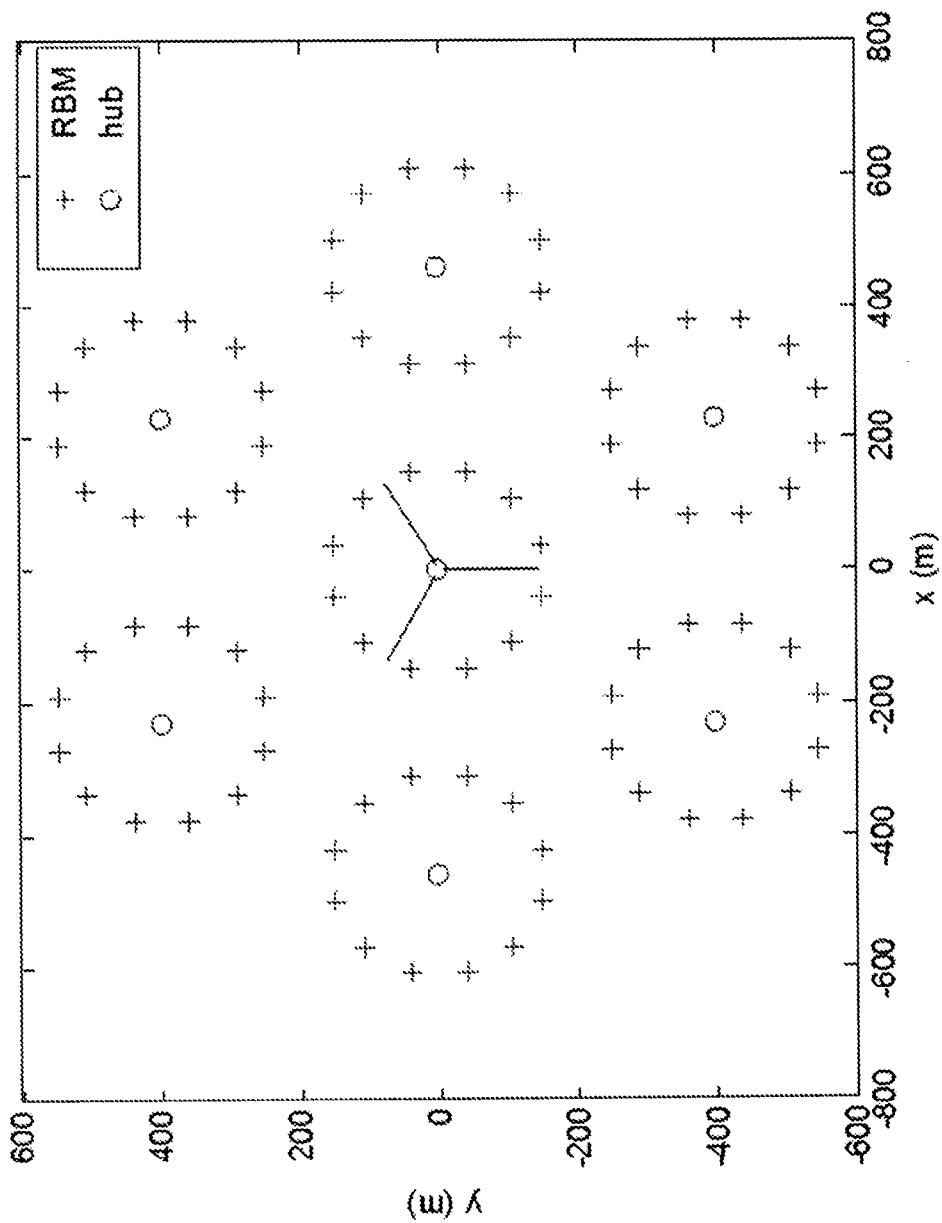
FIG. 2 shows a schematic diagram of a wireless backhaul interference network comprising 21 hubs and 84 RBMs with the frequency use factor=1.
Figure 3:
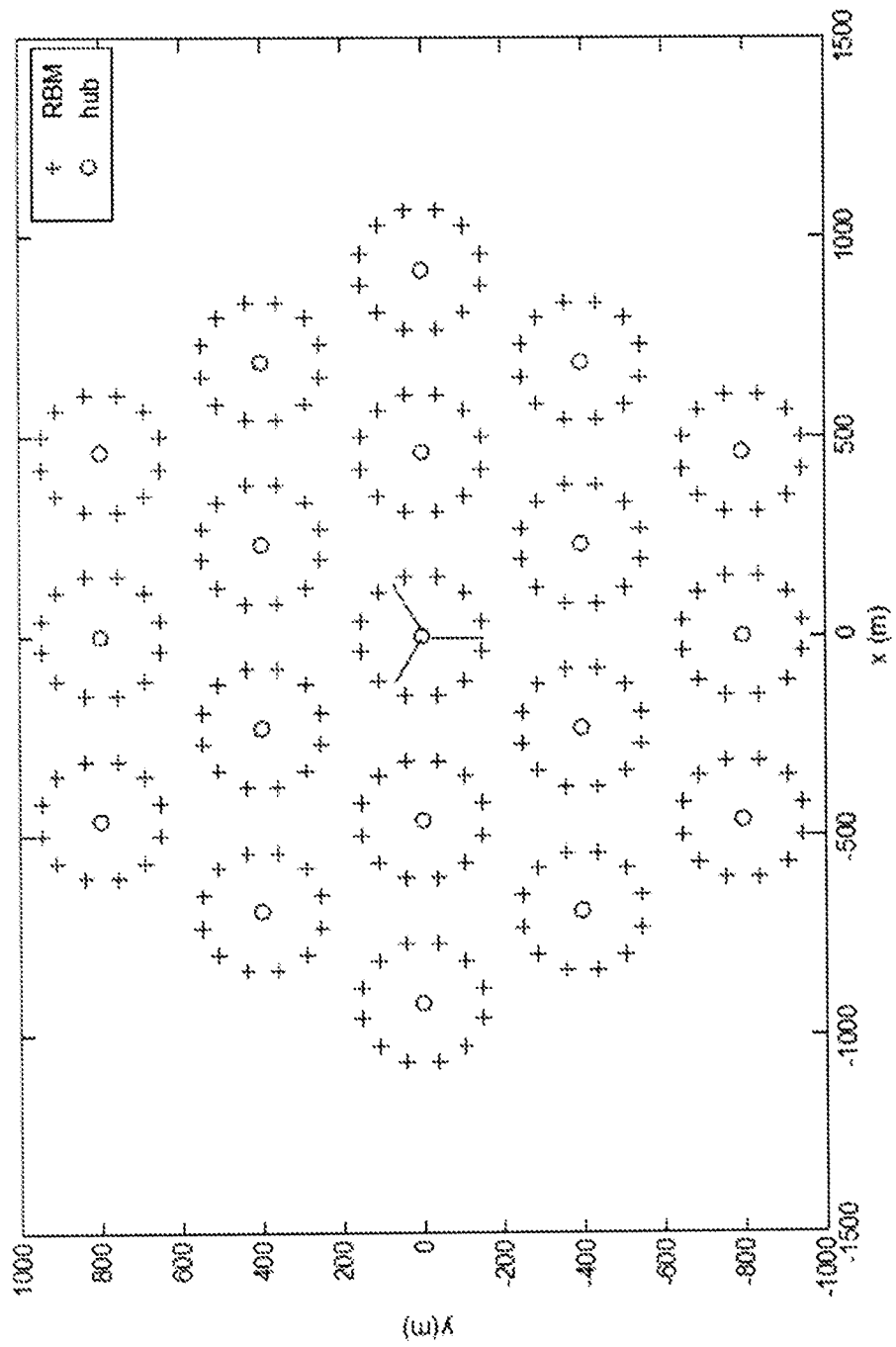
FIG. 3 shows a schematic diagram of a wireless backhaul interference network comprising 57 hubs and 228 RBMs with the frequency use factor=1.
Figure 4:
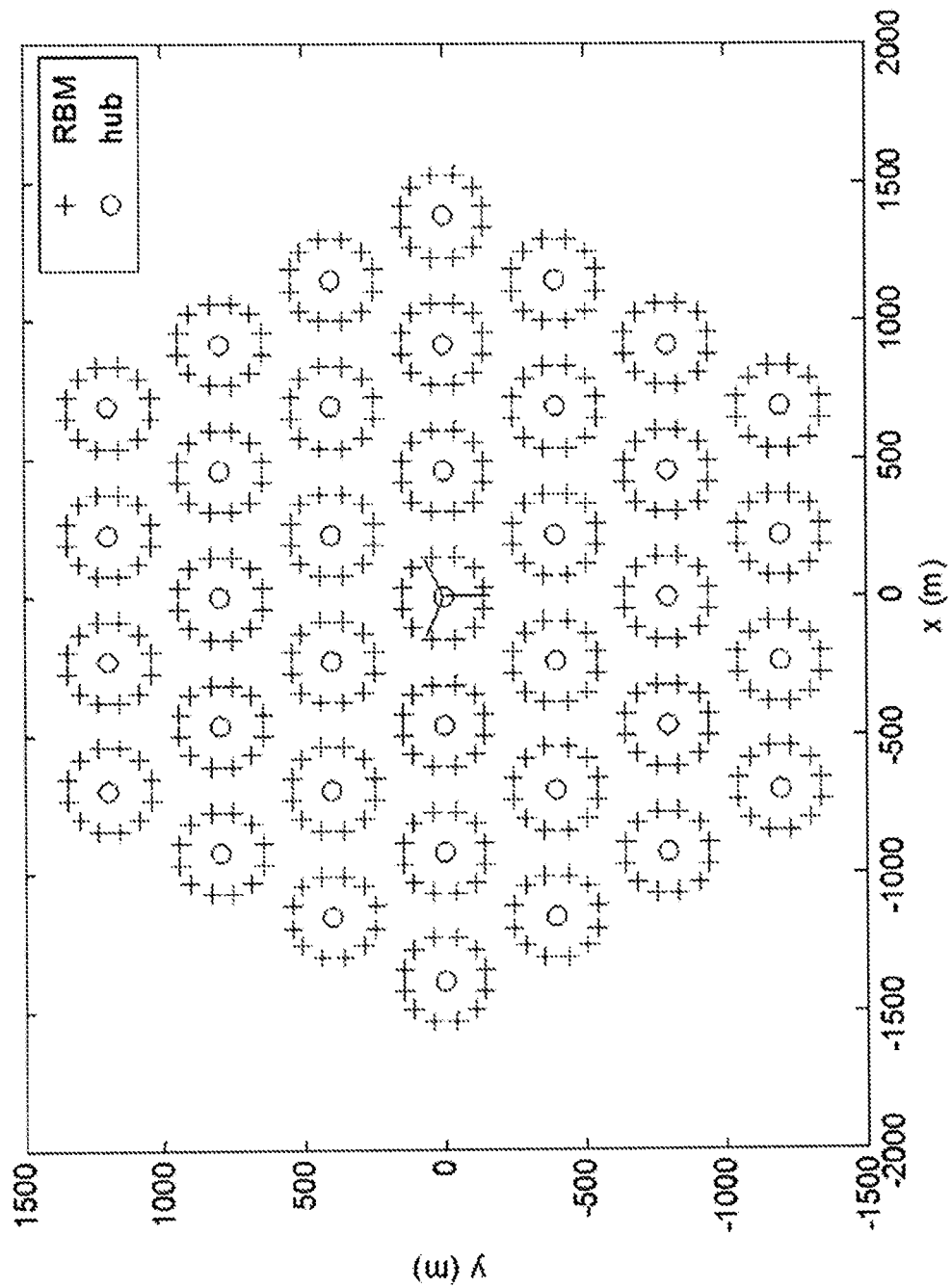
FIG. 4 shows a schematic diagram of a wireless backhaul interference network comprising 111 hubs and 444 RBMs with the frequency use factor=1.

FIG. 2 show a schematic diagram representing a wireless backhaul network comprising 21 hubs, each serving a plurality of RBMs. As indicated schematically for the central node in FIG. 2, in each cell, the circle indicating the "hub" comprises 3 hub modules. Each hub module has an antenna oriented to serve a 120 degree sector with four RBMs. FIGS. 3 and 4 are schematic diagrams representing networks of different network sizes comprising 57 hubs to 111 hubs respectively. In each, the frequency reuse factor is one.

Parameters used for the system simulations are listed in the table shown in FIG. 5. FIG. 6 lists the SINR target in dB, for different modulation and coding formats.

In a wireless backhaul network comprising a plurality of nodes comprising hubs and RBMs, a method for determining network clusters according to an embodiment of the present invention, determines which RBMs are served by a particular hub based on obtaining a link quality value metric for each hub-RBM link, ranking the links based on the link quality value, and determining hub-RBM clusters from a highest to lowest ranking of the link quality values. The clustering method takes into account any constraints on the maximum number of RBMs per cluster and clusters each RBM only once, i.e. each RBM belongs to only one cluster. A link quality value based method for determining the clustering outcomes can provide an increased average link quality value, or e.g. an increased average network data rate.

The clustering method according to the embodiment determines the RBM antenna orientation directions. On each bin, the initial power assigned to all hubs is set to the maximum allowable power. The LQV metric used for determining clusters is based on the combined link quality values of all bins calculated based on the initial power. On each bin, the link quality for each hub and RBM link is determined assuming the RBM steers its main lobe to maximize the overall link quality value of this link.

Thus, the method comprises obtaining link quality values for each of a plurality of hub-RBM links, either by measurement or computation from network parameters, and from the input link quality values for each hub-RBM link, performing "link quality based clustering" steps comprising:

i. Ranking link quality values of each of the plurality of hub-RBM links, or for each of multiple RBM candidate site locations, and choosing the maximum of these link quality values to obtain an input link quality table.

ii. Reshaping the link quality table into a vector in a column-wise order and ranking link quality values of the link quality tables.

iii. From the highest to the lowest link quality links, identifying each hub-RBM cluster by excluding the scenario of an RBM being clustered more than once and by satisfying a maximum number of RBM per cluster constraint.

Figure 7:
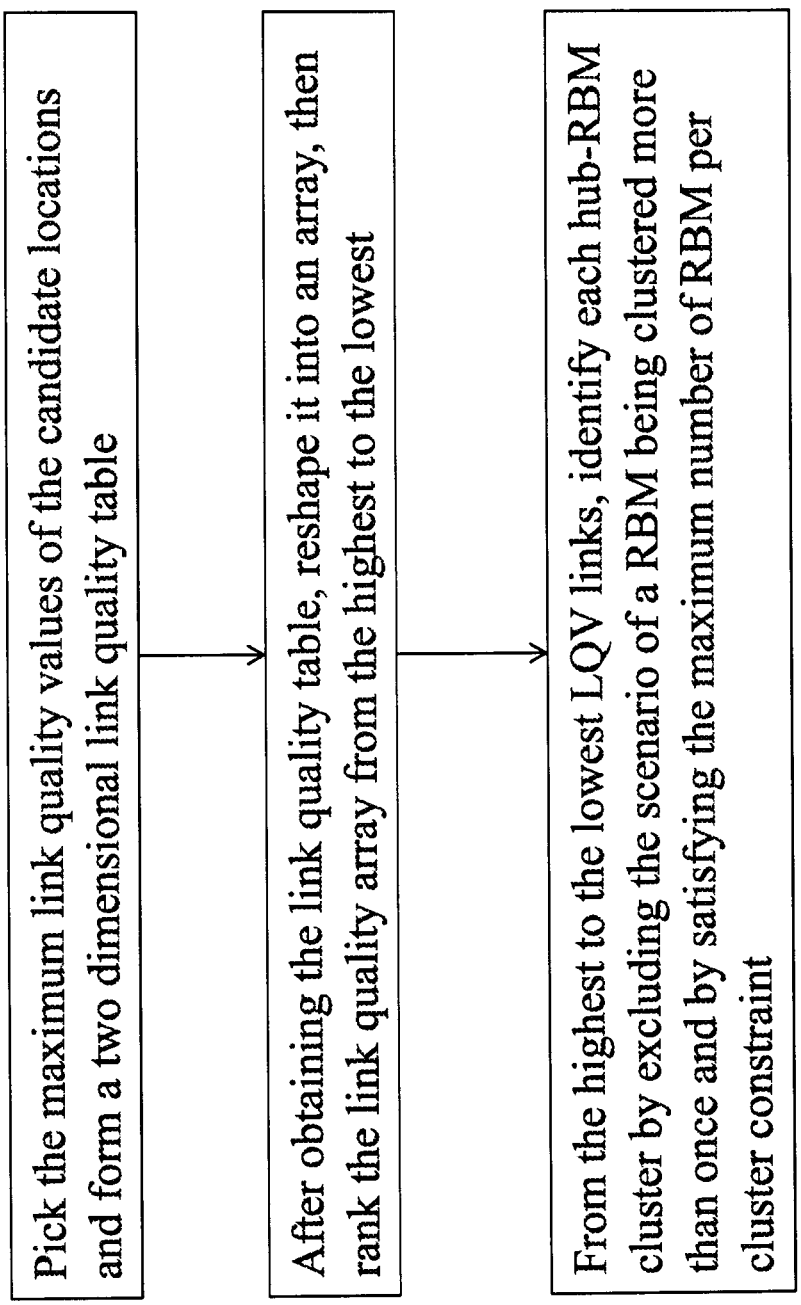
FIG. 7 shows a flow chart representing steps of a method according to an embodiment of the invention, for determining clusters in the backhaul network.

FIG. 7 shows the flow chart representing steps of the clustering method, which comprise: picking the maximum LQV of the candidate locations, forming a two dimensional LQV table, reshaping the table into an array, ranking the LQV array from highest to lowest, then, from the highest to the lowest identifying each hub-RBM cluster satisfying constraints including excluding an RBM being clustered more than once and a maximum number of RBM per cluster.

Thus, if there are N hubs and each cluster has M RBMs, the total number of RBMs is NM. For the link between hub i and RBM j at its $k^{th}$ candidate location, the LQV is denoted by $LQV_{ijk}$. The LQVs are further processed so that $LQV_{ij}=\max_k LQV_{ijk}$. A two dimensional LQV table is formed. The two dimensional table of LQV (of a size N×NM) is then reshaped into a vector (array) and the LQVs of the vector are ranked. The reshape function performs the operation in a column-wise order. The ranking operation is denoted by a permutation π, which reorders the LQVs from the highest to the lowest. The inverse permutation of π is denoted by $π^{-1}$, which maps the index of the reordered LQVs to the index of the reshaped LQVs. Therefore, the first RBM ID and hub ID in the reordered LQV vector are respectively:

$$RBM\ ID(1) = \text{mod}\left(\frac{\pi^{-1}(t)-1}{NM}\right)+1 \quad \text{Equation 1}$$

$$\text{hub}\ ID(1) = \text{floor}\left(\frac{\pi^{-1}(t)-1}{NM}\right)+1.$$

For the $t^{th}$ position in the reordered LQV vector, the RBM ID and hub ID are computed as $$RBM\ ID(t) = \text{mod}\left(\frac{\pi^{-1}(t)-1}{NM}\right)+1 \quad \text{Equation 2}$$

$$\text{hub}\ ID(t) = \text{floor}\left(\frac{\pi^{-1}(t)-1}{NM}\right)+1.$$

Initially, the clusters have RBM counts equal to 0. The set of identified RBMs for each cluster is denoted by $β_i$ for the $i^{th}$ hub/cluster. The sets $β_i$ are initialized to be empty sets. Starting with t=1, thus the first search position in the reordered LQV vector is 1. The first identified RBM ID is stored in a set denoted by Ω (the set of all identified RBMs). RBM ID (1) is added to the set $β_{hub\ ID\ (1)}$. The RBM count for hub ID (1) is updated to be 1.

The clustering process continues from the second element in the reshaped LQV vector (t=2), searching elements one by one. If hub ID (t)'s RBM count does not reach M and RBM ID (t) has not been identified in the search process (i.e., RBM ID (t) does not appear in the set Ω), RBM ID (t) is added to the set $β_{hub\ ID\ (t)}$ and the RBM count of hub ID (t) increases by 1. Then, RBM ID (t) is added to the set Ω. Otherwise, no operations are done for $β_i$, Ω and the RBM counts of each hub. The process is continued until the set Ω has a size NM.

Figure 8:
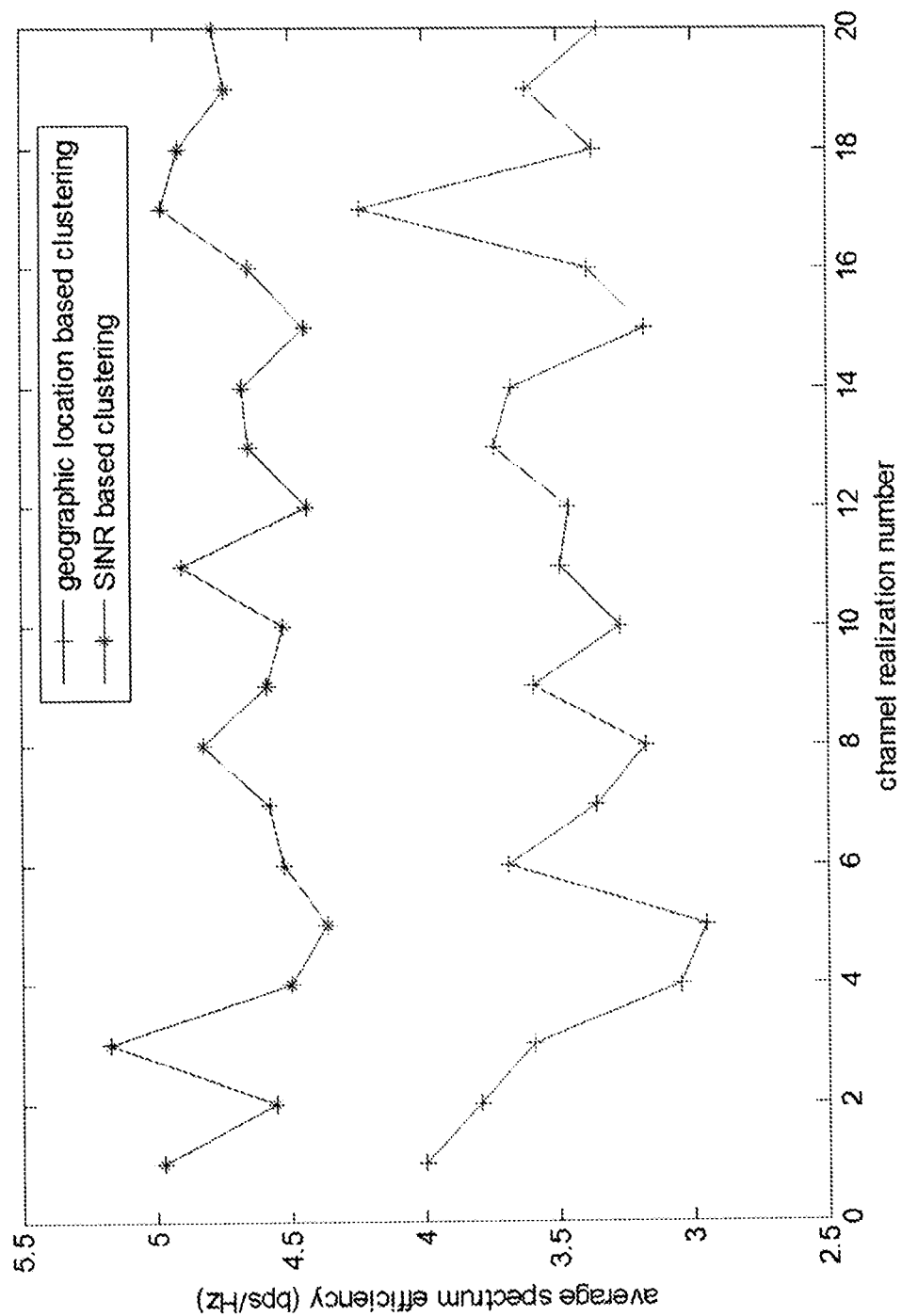
FIG. 8 shows a simulation schematic that plots the average spectrum efficiency of the downlink of the backhaul network for different realizations of the channel.
Figure 9:
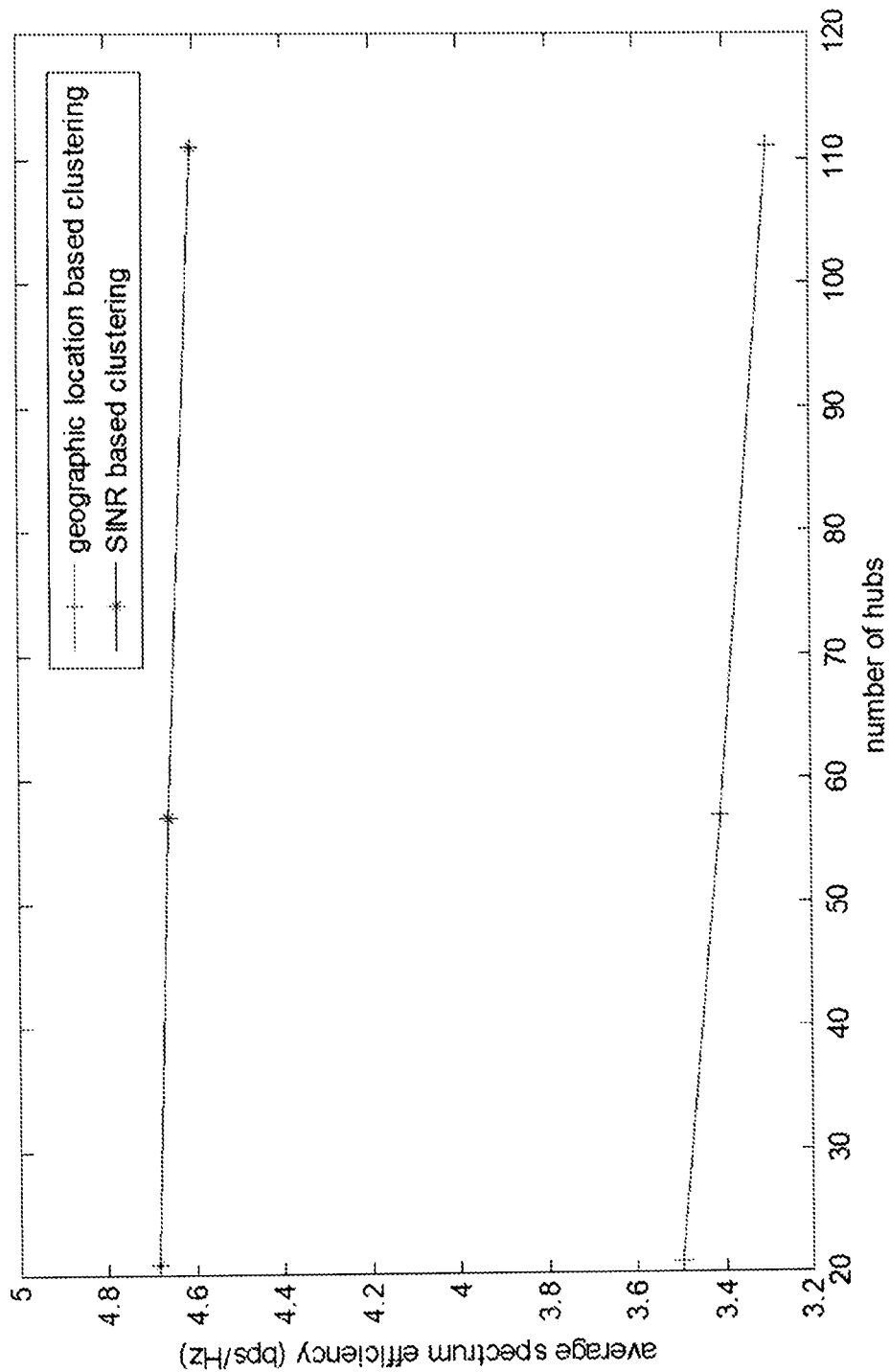
FIG. 9 shows a simulation schematic for the clustering gain in terms of spectrum efficiency as the number of hubs increases (21, 57 and 111 hubs).

For performance evaluation, the averaged SINR across the frequency bins for each link was used as the LQV metric. The simulation results are summarized in the following two paragraphs, with reference to FIGS. 8 and 9, which compare the SINR based clustering of the present embodiment with conventional geographic location based clustering. FIG. 8 shows a simulation schematic that plots the average spectrum efficiency of the downlink of the backhaul network for different realizations of the channel. FIG. 9 shows the clustering gain in terms of spectrum efficiency as the number of hubs increases (21, 57 and 111 hubs).

In FIG. 8, the average spectrum efficiency with the clustering method of the embodiment outperforms the average spectrum efficiency based on geographic location based clustering method by about 1.19 bps/Hz. This simulation was performed for the topology with 21 hubs and 84 RBMs. This translates to around 34% of the spectrum efficiency gain considering that the average spectrum efficiency with the geographic based clustering is about 3.5 bps/Hz.

As the number of hubs increases, the spectrum efficiency gain decreases slightly. However, the percentage gain is still approximately 35%.

The LQV may be defined as one of a) the SINR value of each link; b) the data rate of each link; c) the weighted data rate of each link; d) the average SINR across frequency bins of each link; e) the average channel gains across frequency bins of each link or e) the inverse of the distance of each link. Advantageously, when the LQV is a weighted LQV value, e.g. a weighted data rate of each link, weights are assigned based on traffic conditions of the links.

The method may comprise approximating the input LQV table based on assigned weights of all links, noise powers, path losses, shadowing losses and transmit/receive antenna gains if it is not feasible to measure directly the LQV values between any hub and RBM (with the best RBM steering).

The path loss and shadowing gain between hub i and RBM j in a linear scale is denoted by $g_{ij}$. The noise power is denoted by $N_{ij}$. The combined transmit and receive antenna gain is denoted by $G_{ij}[j \to i]$ assuming the mainlobe of the RBM j's antenna is steered towards hub i. The transmit power of all hubs is denoted by P. For example, when the SINR value of any hub-RBM link cannot be directly measured, the SINR values for each bin can be approximated using the following formula:

$$SINR_{ij} = \frac{G_{ij}[j \to i]g_{ij}P}{N_{ij} + \sum_{l \ne i} G_{lj}[j \to i]g_{li}P}. \quad \text{Equation 3}$$

Thus, for example, the LQV metric can be defined as the average SINR of all frequency bins of each link. Shadowing and path loss information are measured based on the methods disclosed in copending U.S. patent application Ser. No. 13/230,368. Combined with the antenna gains, the SINR values of each hub-RBM link can be computed according to the equation 3 above, and used as the input data to the clustering method.

Thus, a method is provided for managing resource allocation for a plurality of radio links in a wireless network, comprising clustering of links based on a link quality value (LQV) of each link, and scheduling resources to links based on said clustering of links, e.g. to provide an increased average link quality value of the network and improved average network data rate.

In practice, the procedure for determining the clusters is part of the practice of optimizing the system performance, i.e. in terms of quality of service, e.g. throughput. In the above referenced copending U.S. patent application Ser. No. 13/463,478 a joint hub power allocation and scheduling method is disclosed to enhance the average network throughput given a pre-determined clustering strategy. This method can be combined with the clustering method disclosed herein to further improve the average network throughput after clustering. This method also presents a practical framework to realize the basic clustering feature of the managed resource allocation (MARA) for a backhaul network as disclosed in the above referenced copending U.S. patent application Ser. No. 13/230,368.

Since the method for determining network clusters uses a link quality ranking criterion to sort the link quality values of the links and identify clusters based on the ranking, it thus has low computational complexity. It does not require exhaustively searching the space of all possible hub-RBM cluster assignments.

Several link quality value metrics are defined and may be used to perform clustering. Advantageously, a weight based on data traffic condition of each hub and RBM link is assigned. When LQV is defined as the weighted data rate of each hub and RBM link, the proposed clustering strategy can achieve good quality of service across the backhaul network. When LQV is defined as the data rate of each link, the clustering strategy simply maximizes the average data rate of the network.

The proposed method can be applied when there are multiple candidate locations for each RBM. In this case, the input LQV table has three dimensions corresponding to the hub index, RBM index, and location index. The output of the proposed method includes the best locations of RBMs over the candidate locations and the resulting clusters.

In summary, methods according to embodiments of the invention provide for clustering of links in a wireless backhaul network based on determining the input link quality values, ranking of link quality values, and from the highest to the lowest link quality values, identifying each hub-RBM cluster to satisfy constraints with respect to clustering each RBM only once and a maximum number of RBM per hub. Link quality value metrics are defined that may be measured in an active network, or alternatively where measurement is not feasible, computed or simulated based on network parameters. Thus, a network planning computer program can be written to implement the method to determine network clusters to improve performance in an active network or for network design and planning purposes. Thus the backhaul network may comprise apparatus comprising a processor and program instructions, e.g. in a control node of the network, for performing the method steps, based on input link quality values that are measured or calculated as described above to determine the network clusters. The output of the program may be displayed in a visual representation based on which the installers can configure the clusters, e.g. for improved performance, such as improved data rate or average link quality value of the network.

INDUSTRIAL APPLICABILITY

Methods and apparatus according to embodiments of the invention have application to determining network clusters, each comprising a hub and a plurality of RBMs, for improving performance of wireless backhaul networks and in particular for increasing data rates of NLOS wireless backhaul networks.

LQV based clustering can achieve a higher average LQV, e.g., average spectrum efficiency or weighted sum spectrum efficiency, for the entire backhaul network compared to the geographic location based clustering. LQV based clustering chooses the links with strong link quality values to optimize the LQV metric, and may additionally take into account a location index. The proposed method is straightforward to implement in practice and has low computational complexity.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method for determining network clusters in a fixed wireless backhaul network comprising a plurality of hubs and a plurality of Remote Backhaul Modules (RBM) having directional antenna, wherein each cluster comprises a hub serving a number of RBMs (hub-RBM cluster), comprising the steps of:

for N hubs, each of the N hubs serving M RBMs, for a total number of NM RBMs, indexing each of the plurality of N hubs i and each of the plurality of NM RBMs j to define a plurality of all N×NM candidate hub-RBM pairs ij;

for hub-RBM radio links ij between each respective hub-RBM pair ij, and for each candidate location k of each RBM j, obtaining an input link quality value $LQV_{ijk}$;

ranking said link quality values $LQV_{ijk}$ of hub-RBM links ij for each candidate location k of each RBM j, and choosing a maximum value $LQV_{ij}$ of these link quality values, where $LQV_{ij}=\max_k LQV_{ijk}$, to obtain a two dimensional input LQV table of values $LQV_{ij}$ of size N×NM;

reshaping the input LQV table into a LQV vector in a column-wise order and ranking link quality values $LQV_{ij}$ to provide a reordered LQV vector, by performing a ranking operation denoted by a permutation π, to reorder the link quality values $LQV_{ij}$ of the LQV vector from the highest to the lowest, and wherein the inverse permutation of π is denoted by $\pi^{-1}$, which maps the index of the reordered link quality values $LQV_{ij}$ to the index of the reshaped LQV vector, the LQV vector comprising two dimensions corresponding to a hub index (hub ID) and an RBM index (RBM ID) wherein: for the $t^{th}$ position in the reordered LQV vector, the RBM ID and hub ID are computed as $$RBM\ ID(t) = \mod\left(\frac{\pi^{-1}(t)-1}{NM}\right)+1$$

$$hub\ ID(t) = \text{floor}\left(\frac{\pi^{-1}(t)-1}{NM}\right)+1$$

identifying each hub-RBM cluster from the reordered LQV vector, comprising: from the highest to the lowest link quality values, identifying each hub-RBM cluster by excluding each RBM from being clustered more than once and by satisfying a maximum number of RBMs per cluster constraint.

2. The method of claim 1, wherein the link quality values $LQV_{ijk}$ are weighted and wherein weights are assigned based on traffic conditions of each link.

3. The method of claim 1, wherein the link quality vector comprises three dimensions, corresponding to said hub index, said RBM index and further comprising a location index, and wherein the step of ranking link quality values of hub-RBM links further comprises ranking link quality values $LQV_{ijk}$ of multiple candidate site locations k for each RBM j and identifying a respective best location of said candidate locations k of each RBM j.

4. The method of claim 1, wherein the link quality values $LQV_{ij}$ are approximated as the SINR values for each frequency bin using:

$$SINR_{ij} = \frac{G_{ij}[j \to i]g_{ij}P}{N_{ij} + \sum_{l \neq i} G_{ij}[j \to i]g_{lj}P},$$

where the path loss and shadowing gain between hub i and RBM j in a linear scale is denoted by $g_{ij}$; the noise power is denoted by $N_{ij}$; the combined transmit and receive antenna gain is denoted by $G_{ij}[j \to i]$ assuming the mainlobe of the RBM j's antenna is steered towards hub i; and the transmit power of all hubs is denoted by P.

5. The method of claim 1, wherein obtaining the link quality values comprises:
   a) measuring said link quality values for each of the plurality of hub-RBM links; or
   b) computing said link quality values from network parameters; and
   wherein link quality values are based on one of:
   a data rate of each link; a weighted data rate of each link wherein weights are assigned based on traffic conditions of the links; a SINR value of each link; an average SINR across frequency bins of each link; an average channel gain across frequency bins of each link; and an inverse distance of each link.

6. A method for managing resource allocation for a plurality of radio links in a fixed wireless backhaul network comprising a plurality of hubs and Remote Backhaul Modules (RBM) having directional antenna, wherein each hub serves a number of RBMs (hub-RBM cluster), comprising:
   clustering the plurality of hubs and RBMs based on a link quality value (LQV) of each radio link by steps comprising:
   for N hubs, each of the N hubs serving M RBMs, for a total number of NM RBMs, indexing each of the plurality of hubs i and each of the plurality of RBMs j to define a plurality of all N×NM candidate hub-RBM pairs ij;
   for hub-RBM radio links ij between each respective hub-RBM pair ij, and for each candidate location k of each RBM j, obtaining an input link quality value $LQV_{ijk}$;
   ranking said link quality values $LQV_{ijk}$ of hub-RBM links ij, for each candidate location k of each RBM j, and choosing a maximum value $LQV_{ij}$ of these link quality values, where $LQV_{ij} = \max_k LQV_{ijk}$, to obtain a two dimensional LQV table of size N×NM;
   reshaping the input LQV table into a LQV vector in a column-wise order and ranking link quality values $LQV_{ij}$ to provide a reordered LQV vector, by performing a ranking operation denoted by a permutation $\pi$, to reorder the link quality values $LQV_{ij}$ of the LQV vector from the highest to the lowest, and
   wherein the inverse permutation of $\pi$ is denoted by $\pi^{-1}$, which maps the index of the reordered link quality values $LQV_{ij}$ to the index of the reshaped LQV vector,
   wherein the $t^{th}$ position in the reordered LQV vector, the RBM ID and hub ID are computed as $$RBM\ ID(t) = \mod\left(\frac{\pi^{-1}(t) - 1}{NM}\right) + 1$$

$$hub\ ID(t) = \text{floor}\left(\frac{\pi^{-1}(t) - 1}{NM}\right) + 1$$

identifying each hub-RBM cluster from the reordered LQV vector, comprising:
   from the highest to the lowest link quality links, identifying each hub-RBM cluster by excluding each RBM from being clustered more than once and by satisfying a maximum number of RBMs per cluster constraint; and
   scheduling resources to links based on said hub-RBM clusters to provide an increased average link quality value of the wireless backhaul network.

7. A method according to claim 6 further comprising managing power allocation and scheduling for interference mitigation in the network based on said hub-RBM clusters.

8. Apparatus for determining network clusters in a fixed wireless backhaul network comprising a plurality of hubs and a plurality of Remote Backhaul Modules (RBM) having directional antenna, wherein each cluster comprises a hub serving a number of RBMs (hub-RBM cluster), said apparatus comprising a processor and instructions for implementing steps of the method defined in claim 1.

9. A non-transitory computer readable storage medium storing instructions which, when executed in a processor of a fixed wireless backhaul network comprising a plurality of hubs and a plurality of Remote Backhaul Modules (RBM) having directional antenna, wherein each cluster comprises a hub serving a number of RBMs (hub-RBM cluster), implement steps of the method defined in claim 1.

10. A method for determining network clusters in a fixed wireless backhaul network comprising a plurality of hubs and a plurality of Remote Backhaul Modules (RBM) having directional antenna, wherein each cluster comprises a hub serving a number of RBMs (hub-RBM cluster), the method comprising the steps of:
   for N hubs, each of the N hubs serving M RBMs, for a total number of NM RBMs, indexing each of the plurality of N hubs i and each of the plurality of NM RBMs j to define a plurality of all N×NM candidate hub and RBM pairs ij;
   for hub-RBM radio links ij between each respective hub i and RBM j pair, and for each candidate location k of an RBM, obtaining an input link quality value $LQV_{ijk}$;
   ranking said link quality values $LQV_{ijk}$ of hub-RBM links ij for each candidate location k of an RBM j, and choosing a maximum value $LQV_{ij}$ of these link quality values, where $LQV_{ij} = \max_k LQV_{ijk}$, to obtain a two dimensional input LQV table of values $LQV_{ij}$ of size N×NM;
   reshaping the input LQV table into a LQV vector in a column-wise order and ranking link quality values to provide a reordered LQV vector;
   identifying each hub-RBM cluster from the reordered LQV vector, comprising: from the highest to the lowest link quality values, identifying each hub-RBM cluster by excluding each RBM from being clustered more than once and by satisfying a maximum number of RBMs per cluster constraint; and
   wherein the link quality values $LQV_{ij}$ are approximated as the SINR values for each frequency bin using:

$$SINR_{ij} = \frac{G_{ij}[j \to i] g_{ij} P}{N_{ij} + \sum_{l \neq i} G_{ij}[j \to i] g_{lj} P},$$

where by $g_{ij}$ denotes a pathloss and shadowing gain between hub i and RBM j in a linear scale; $N_{ij}$ denotes a noise power; $G_{ij}[j \to i]$ denotes a combined transmit and receive antenna gain assuming a mainlobe of the antenna of RBM j is steered towards hub i; and P denotes a transmit power of all hubs.

* * * * *